United States Patent
Haeffele et al.

(10) Patent No.: US 11,175,627 B2
(45) Date of Patent: Nov. 16, 2021

(54) SYSTEM AND METHOD FOR RECONSTRUCTION OF HOLOGRAPHIC LENS-FREE IMAGES BY MULTI-DEPTH SPARSE PHASE RECOVERY

(71) Applicant: miDiagnostics NV, Leuven (BE)

(72) Inventors: Benjamin D. Haeffele, Oakland, CA (US); Rene Vidal, Baltimore, MD (US)

(73) Assignee: miDiagnostics NV, Leuven (BE)

( * ) Notice: Subject to any disclaimer, the term of this patent is extended or adjusted under 35 U.S.C. 154(b) by 154 days.

(21) Appl. No.: 16/347,191

(22) PCT Filed: Nov. 3, 2017

(86) PCT No.: PCT/US2017/059931
§ 371 (c)(1),
(2) Date: May 2, 2019

(87) PCT Pub. No.: WO2018/085655
PCT Pub. Date: May 11, 2018

(65) Prior Publication Data
US 2020/0057411 A1   Feb. 20, 2020

Related U.S. Application Data

(60) Provisional application No. 62/417,708, filed on Nov. 4, 2016.

(51) Int. Cl.
*G03H 1/08* (2006.01)
*G03H 1/22* (2006.01)

(52) U.S. Cl.
CPC ....... *G03H 1/2294* (2013.01); *G03H 2226/02* (2013.01)

(58) Field of Classification Search
CPC .. G03H 1/2294; G03H 1/0808; G03H 1/0443; G03H 1/0866; G03H 2001/0038; G03H 2001/0883; G03H 2001/0447; G03H 2226/02; G03H 2210/33; G03H 2240/56
USPC .......................................................... 359/9
See application file for complete search history.

(56) References Cited

PUBLICATIONS

Compressive sensing for improved depth discrimination in 3D holographic reconstruction by Rivenson et al., Proc. of SPIE vol. 8738, pp. 1-6. (Year: 2013).*
Song, J., et al., Sparsity-Based Pixel Super Resolution for Lens-Free Digital In-line Holography, Scientific Reports, Apr. 21, 2016, 6:24681, pp. 1-9.
Denis, L., et al.. Inline hologram reconstruction with sparsity constraints, Optics Letters, Optical Society of America, 2009, vol. 34, No. 22, pp. 3475 (4 pages).
Rivenson, Y., et al., Sparsity-based multi-height phase recovery in holographic microscopy, Scientific Reports, Nov. 30, 2016, 6:37862, pp. 1-9.
Haeffele, B.D., et al., Efficient Reconstruction of Holographic Lens-Free Images by Sparse Phase Recovery, Medical Image Computing and Computer-Assisted Intervention—MICCAI, Sep. 4, 2017, pp. 109-117.

* cited by examiner

*Primary Examiner* — Audrey Y Chang
(74) *Attorney, Agent, or Firm* — Hodgson Russ LLP (57) ABSTRACT

A system for lens-free imaging includes a processor in communication with a lens-free image sensor. The processor is programmed to operate the image sensor to obtain a hologram ??. The processor is further programmed to generate, from the hologram, a reconstructed image X and phase W at a focal depth z using an assumption of sparsity.

13 Claims, 5 Drawing Sheets

SYSTEM AND METHOD FOR RECONSTRUCTION OF HOLOGRAPHIC LENS-FREE IMAGES BY MULTI-DEPTH SPARSE PHASE RECOVERY

CROSS-REFERENCE TO RELATED APPLICATIONS

This application claims priority to U.S. Provisional Application No. 62/417,708 titled "SYSTEM AND METHOD FOR RECONSTRUCTION OF HOLOGRAPHIC LENS-FREE IMAGES BY MULTI-DEPTH SPARSE PHASE RECOVERY" filed Nov. 4, 2016, the entire disclosure of which is incorporated herein by reference.

BACKGROUND

The present disclosure relates to lens-free imaging, and more particularly to reconstructing images from holograms.

Lens-free imaging is a microscopy technique based on the principle of digital holography. In digital holography a coherent light source (e.g., a laser) is used to illuminate the object specimen. As light passes through the specimen it is diffracted by the specimen, and the resulting diffraction pattern is recorded by an image sensor such as a charge coupled device (CCD). After the resulting diffraction pattern has been recorded, an image of the specimen is reconstructed by post-processing the diffraction pattern by using a mathematical model of the diffraction process.

Holographic lens-free microscopy has several advantages over conventional microscopy. First, because there are no lenses in the system, the overall cost and physical size of the imaging system can be greatly reduced compared to traditional microscopes. Additionally, lens-free microscopy also allows much wider fields of view to be imaged than conventional microscope with equal magnification. Finally, because the image of the specimen is generated through post-processing the recorded diffraction pattern, there is no need for an operator to manually focus the system as the focal depth can be adjusted automatically through post-processing.

Figure 1:
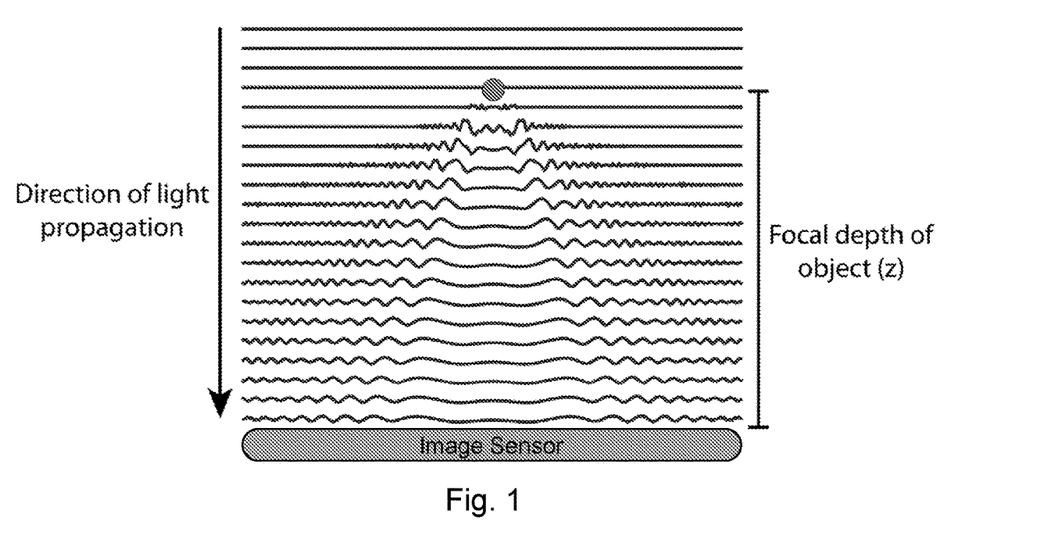
FIG. 1 is an example of light diffraction induced by an object.

FIG. 1 depicts the diffraction of coherent light induced by an object as the light passes through the object. In principle, if one could record the exact diffraction pattern of an object illuminated with a coherent light source (e.g., a laser), then the diffraction pattern would contain sufficient information to reconstruct a perfect image of the specimen at any desired focal depth. Unfortunately, however, due to the wave nature of light the full diffraction pattern of an object is a complex valued entity parameterized by both the amplitude and the phase of the electromagnetic wave at a given location in space (with the frequency of the wave assumed to be equal to the illuminating coherent light). This presents a significant challenge for applying lens-free imaging in practice due to the fact that imaging sensors, such as a CCD, are typically only capable of recording the amplitude of the diffraction pattern but not the phase. As a result, a significant portion of the information necessary to perfectly reconstruct the image of the specimen cannot be recorded, which manifests as significant artifacts when one attempts to reconstruct an image of the specimen with conventional approaches. Additionally, traditional approaches to lens-free imaging typically only attempt to reconstruct an image of the specimen at a single focal depth, but if the specimen contains objects at multiple focal depths, then the diffraction from out-of-focus objects will corrupt the reconstructed images at a given focal depth.

SUMMARY

The presently-disclosed techniques address both of the above-described shortcomings of prior approaches—poor image reconstruction and limitation to a single focal depth by utilizing a system and method to efficiently reconstruct images of a specimen from a recorded diffraction pattern over potentially multiple depths of focus while simultaneously generating an estimate of the missing phase information. Using the disclosed technique results in significantly improved image quality over traditional image reconstruction techniques, allows for a three dimensional volume of the specimen to be reconstructed simultaneously, and provides a robust means of finding focal depths that contain objects, eliminating the need to manually tune focal depth.

The presently-disclosed techniques are advantageous over previous approaches in that it provides strong empirical convergence and efficiently solves image reconstruction problems for large-scale images. Additionally, the present method allows for the efficient reconstruction of a 3-dimensional volume from a single recorded hologram and eliminates the need for light sources with varying optical wavelength.

BRIEF DESCRIPTION OF THE DRAWINGS

For a fuller understanding of the nature and objects of the disclosure, reference should be made to the following detailed description taken in conjunction with the accompanying drawings, in which.

DETAILED DESCRIPTION

Holographic lens-free imaging is based on the principle of recording the diffraction pattern of light after it has passed through a specimen and attempting to invert the light diffraction process to reconstruct an image of the specimen. Unfortunately, the recorded diffraction pattern does not contain sufficient information to adequately reconstruct an image of the specimen, and as result many existing reconstruction techniques suffer from substantial artifacts and degraded image quality. The present disclosure provides a technique to reconstruct holographic lens-free images with dramatically improved image quality over existing techniques and allows for the possibility of reconstructing images at multiple depths of focus simultaneously.

Before describing the mathematical background necessary to describe the presently-disclosed methods and systems, the mathematical notation is described. Matrices are denoted with upper-case letters (X), vectors with lower-case bold letters (x), and scalars with lower-case letters (x). The set of complex numbers is denoted as $\mathbb{C}$, and the set of real numbers is denoted as $\mathfrak{R}$. Given a vector x, x[i] denotes the $i^{th}$ entry of x. Likewise, given a matrix X, X[i,j] denotes the entry of X in the $i^{th}$ row and $j^{th}$ column. The angle of a complex number x is denoted as $\sphericalangle x$, the amplitude is denoted as |x|, and the conjugate is denoted as $\overline{x}$. For a matrix (or vector) $X \in \mathbb{C}^{m \times n}$, |X| denotes an m×n matrix containing the absolute values of the entries of X, $\sphericalangle X$ denotes an m×n matrix containing the angles of the entries of X, and $\overline{X}$ denotes an m×n matrix containing the conjugates of the entries of X.

Given a matrix (or vector) $X \in \mathbb{C}^{m \times n}$, the $l_1$ norm of X is denoted $\|X\|_1$ and defined as $\|X\|_1 = \sum_{i=1}^m \sum_{j=1}^n |X[i,j]|$; the Frobenius norm of X is denoted $\|X\|_F$ and defined as $\|X\|_F = \sqrt{\sum_{i=1}^m \sum_{j=1}^n |X[i,j]|^2}$.

For two matrices, $X \in \mathbb{C}^{m \times n}$ and $Y \in \mathbb{C}^{m \times n}$, $X \odot Y$ denotes the entry-wise product of their entries, and $\langle X, Y \rangle$ denotes the dot-product of the two matrices. The two dimensional discrete Fourier transform of a matrix X is denoted $\mathcal{F}(X)$, and the inverse discrete Fourier transform is denoted $\mathcal{F}^{-1}(X)$. The two dimensional convolution of two signals will be denoted as X*Y. A matrix (or vector) of all zeros or ones will be denoted as 0 or 1, respectively, with the size being clear from context.

Holographic Imaging

The holographic imaging process is based on the process of optical diffraction. A full review of diffraction theory is beyond the scope of this document, but a commonly used approximation which is very accurate for the typical distances used in holography is to model the diffraction process as a two-dimensional convolution. In particular, for an optical wavefront at a plane, $X_0$, the wavefront that will result from propagating that wavefront forward to a plane a distance z away, $X_z$, is given by the equation $$X_z = T(z) * X_0 \quad (1)$$

where T(z) denotes a transfer function that models the diffraction of light over a distance z. Various choices can be made for T(z) depending on the particular approximations one chooses in the model of the diffraction process (e.g., Fresnel, Huygens, far-field). The approximation used herein is the wide-angular spectrum (WAS) approximation, which defines the transfer function in the frequency domain as $$\mathcal{F}(T(z))[k_x, k_y] = \begin{cases} \exp(iz\sqrt{k^2 - k_x^2 - k_y^2}) & k_x^2 + k_y^2 \leq k^2 \\ 0 & \text{otherwise} \end{cases} \quad (2)$$

where $k = 2\pi/\gamma$ is the wavenumber for light with wavelength $\gamma$ and $(k_x, k_y)$ denote the spatial frequencies in the horizontal and vertical directions, respectively. Note that the WAS transfer function has several easily verified properties which will be exploited in the presently-disclosed technique.

1. $T(z_1) * T(z_2) = T(z_1 + z_2)$.
2. $T(0) * X = X$.
3. $T(-z) = \overline{T(z)}$.
4. The linear operator $\mathcal{T}_z(X) \equiv T(z) * X$ is a unitary operator.

Recall also that the convolution of X with T(z) can be efficiently calculated by using the properties of the Fourier transform, $$X * T(z) = \mathcal{F}^{-1}(\mathcal{F}(X) \odot \mathcal{F}(T(z))). \quad (3)$$

Using the WAS approximation as a model for light diffraction, if one is given a diffraction pattern recorded from an image sensor, $H \in \mathfrak{R}^{m \times n}$ then one can try to find a corresponding image of a specimen, $X \in \mathbb{C}^{m \times n}$, at a given focal depth, $z \in \mathfrak{R}$, such that $H = T(z) * X$. As a result, a simple way to reconstruct an estimate of the specimen image is to solve a least-squares problem of the form $$\min_X \frac{1}{2} \|H - T(z) * X\|_F^2. \quad (4)$$

Figure 2:
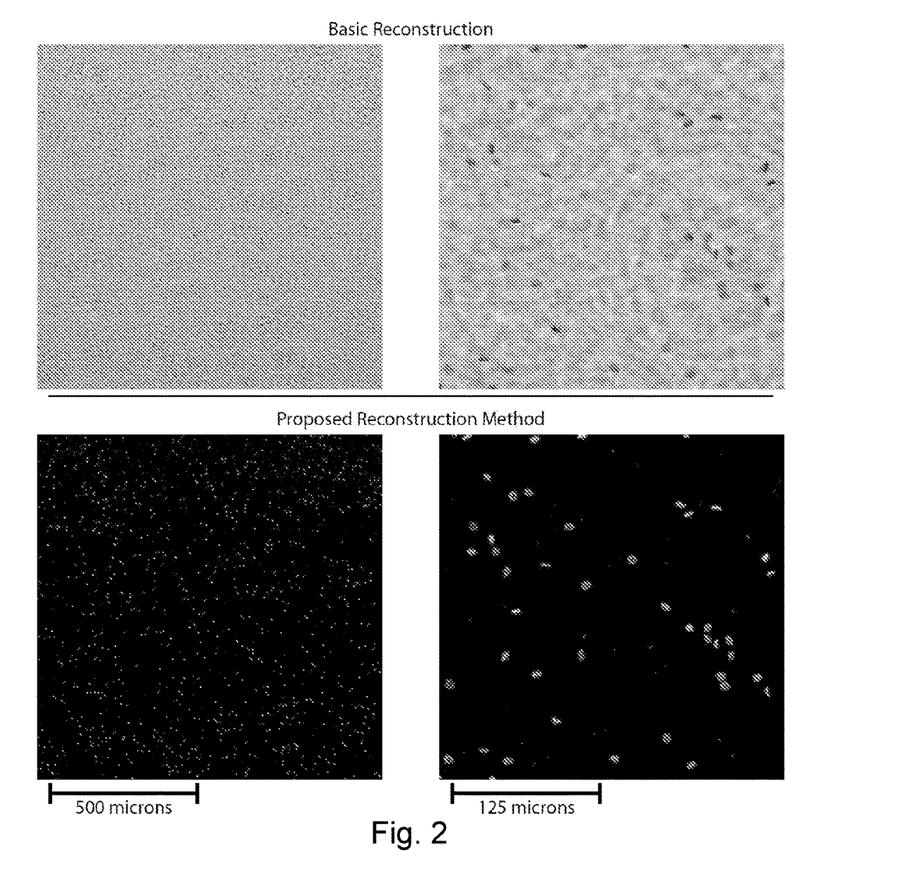
FIG. 2 is a set of image reconstructions of a whole blood sample using different reconstruction algorithms showing both a large field of view (left) and a zoomed in portion of the image (right), where the top panels show images using a basic reconstruction algorithm and the bottom panels show images reconstructed using an embodiment of the present disclosure.

Note that because T(z) satisfies the properties listed above and the fact that the Frobenius norm is invariant to unitary operations gives that the optimal solution to the above problem can be easily computed in closed form as $X^* = T(-z) * H$. However, recall that image sensors are only capable of recording the amplitude of the diffraction pattern but not the phase (i.e., H is real valued in practice when in actuality it should be complex valued). This limitation results in serious artifacts in the reconstructed image—commonly referred to as twin-image artifacts—that are typically characterized by wave-like artifacts emanating from the object. FIG. 2 (Top Panel) shows an example image of human blood reconstructed using this approach; note the large amount of wave-like artifacts present in the reconstructed images.

One possibility to address this problem is to modify the problem in (4) to account for the fact that one should only be concerned with matching the magnitude of the estimated hologram, which can be expressed mathematically by solving a least-squares problem of the form $$\min_X \frac{1}{2} \||H| - |T(z) * X|\|_F^2. \quad (5)$$

Note that the above problem can be equivalently expressed in the form $$\min_{X,W} \frac{1}{2} \|H \odot W - T(z) * X\|_F^2 \quad \text{subject to } |W| = 1 \quad (6)$$

where the equivalence between (5) and (6) is seen by noting that the optimal solution for W in (6) for any value of X is given by $W^*[i,j] = \exp(i \sphericalangle (T(z) * X)[i,j])$, and substituting this value for $W^*$ into (6) gives (5).

While the modification of (4) into forms (5) and (6) has accounted for the fact that the phase information is missing from the recorded hologram, H, note that the system is now underspecified. This can be seen be considering (6) and noting that since T(z) is a unitary operator, for any choice of W one can generate a reconstructed image X such that H⊙W=T(z)*X. In other words, the estimated phase term, W, is totally arbitrary in this model, so one must make additional assumptions about the problem in order to find meaningful solutions.

Sparse Phase Recovery

Recall from the previous section that due to the nature of the lens-free reconstruction problem in (6), the system is under-determined and additional assumptions are necessary to find meaningful solutions. In particular, that the reconstructed image, X, should be "sparse," and the assumption of sparsity is justified whenever the objects in the specimen occupy only a portion of the pixels with the field of view with many of the pixels being equal to the background intensity. The sparsity assumption is incorporated mathematically by adding a regularization term to (6) to encourage solutions where the reconstructed image, x, is sparse:

$$\min_{X,W} \frac{1}{2} \| H \odot W = \mu 1 - T(z) * X \|_F^2 + \lambda \| X \|_1 \quad (7)$$

subject to $|W| = 1$

Note that there are many ways to measure the sparsity of a signal, but the $l_1$ norm is used in this discussion as it has the desirable property of encouraging sparse solutions while still being a convex function and conducive to efficient optimization. Additionally, typical measures of sparseness require that most of the entries are identically 0, while here if a pixel doesn't contain an object the value of the pixel will be equal to the background intensity of the illumination light. As a result, the non-zero background is accounted for by adding an additional term to the model to capture (assumed constant) illumination light with the $\mu \in \mathbb{C}$ scalar term.

Solving the Sparse Phase Recovery Model

While the model given in (7) has many theoretical justifications based on the nature of the lens-free imaging reconstruction problem, unfortunately, the optimization problem is non-convex due to the constraint that $|W|=1$. Nevertheless, despite this challenge, a method based on alternating minimization is described herein that allows for closed form updates to all of the variables, is highly efficient, and is guaranteed to converge to at least a Nash equilibrium point of the objective function. First, because the convolution with T(z) is a unitary operator for any z, (7) can be equivalently reformulated using the relation $$\tfrac{1}{2} \| H \odot W - \mu 1 - T(z)*X \|_F^2 = \tfrac{1}{2} \| T(-z)*(H \odot W) - \mu \exp(-izk)1 - X \|_F^2 \quad (8)$$

where the equality comes from the unitary invariance of the Frobenius norm, the properties of the T(z) operator described above, and the definition of T(z) in (2).

From the above relation, it is now possible to derive closed form updates to each variable in (7) if the other variables are held constant. In particular, one has the following, $$\operatorname{argmin}_W (7) = \exp(i \sphericalangle (\mu 1 + T(z)*X)) \quad (9)$$

$$\operatorname{argmin}_\mu (7) = \frac{\exp(izk)}{mn} \langle T(-z)*(H \odot W) - X, 1 \rangle \quad (10)$$

$$\operatorname{argmin}_X (7) = SFT_\lambda \{ T(-z)*(H \odot W) - \mu \exp(-izk)1 \} \quad (11)$$

where $SFT_\lambda \{ \cdot \}$ denotes the complex soft-thresholding operator which is given by $$SFT_\lambda \{Z\}[i,j] = \begin{cases} Z[i,j] \frac{|Z[i,j]| - \lambda}{|Z[i,j]|} & |Z[i,j]| > \lambda \\ 0 & |Z[i,j]| \le \lambda \end{cases} \quad (12)$$

Using these updated equations, it is then possible to efficiently reconstruct images from the recorded diffraction patterns using the alternating sequence of updates to the variables described in Method 1. While the optimization problem described by (7) is non-convex overall due to the constraint on W, very strong convergence of Method 1 has been observed within approximately just 10-15 iterations. Further, due to the fact that the main computational burden in Method 1 lies in computing Fourier transforms and element-wise products, the computation is significantly accelerated by performing the calculation on a graphical processing unit (GPU). FIG. 2 (Bottom Panel) shows an image of human blood reconstructed using the proposed method. Note that the wave-like artifacts from the basic reconstruction method have been completely eliminated and that the contrast of the red blood cells in the image has been increased significantly with many cells that were undetectable using the basic reconstruction method now becoming clearly visible.

---

METHOD 1 (Single Focal Depth Reconstruction)

INPUTS: H - Recorded hologram, z - Focal depth, λ - Sparsity parameter.
OUTPUTS: X - Reconstructed image, W - Estimated phase, μ - Fit to background.
Initialize: X = 0, W = 1, μ = 0.
Calculate the Fourier transform of the transfer function, $\mathcal{F}(T(z))$, from (2).
Initialize: Q = T(-z) * H = $\mathcal{F}^{-1}(\overline{\mathcal{F}(T(z))} \odot \mathcal{F}(H))$.
Update the variables in an alternating fashion until the desired number of iterations.
for iter = 1 to number of iteration do $$\mu = \frac{\exp(izk)}{mn} \langle Q - X, 1 \rangle.$$

W = exp(i∢(μ1 + T(z) * X)) = exp(i∢(μ1 + $\mathcal{F}^{-1}$ ($\mathcal{F}$(T(z)) ⊙ $\mathcal{F}$(X)))).
Q = T(-z) * (H ⊙ W) = $\mathcal{F}^{-1}$($\overline{\mathcal{F}(T(z))}$ ⊙ $\mathcal{F}$(H ⊙ W)).
X = $SFT_\lambda$(Q - μ exp(-izk)).
end for

---

Figure 3:
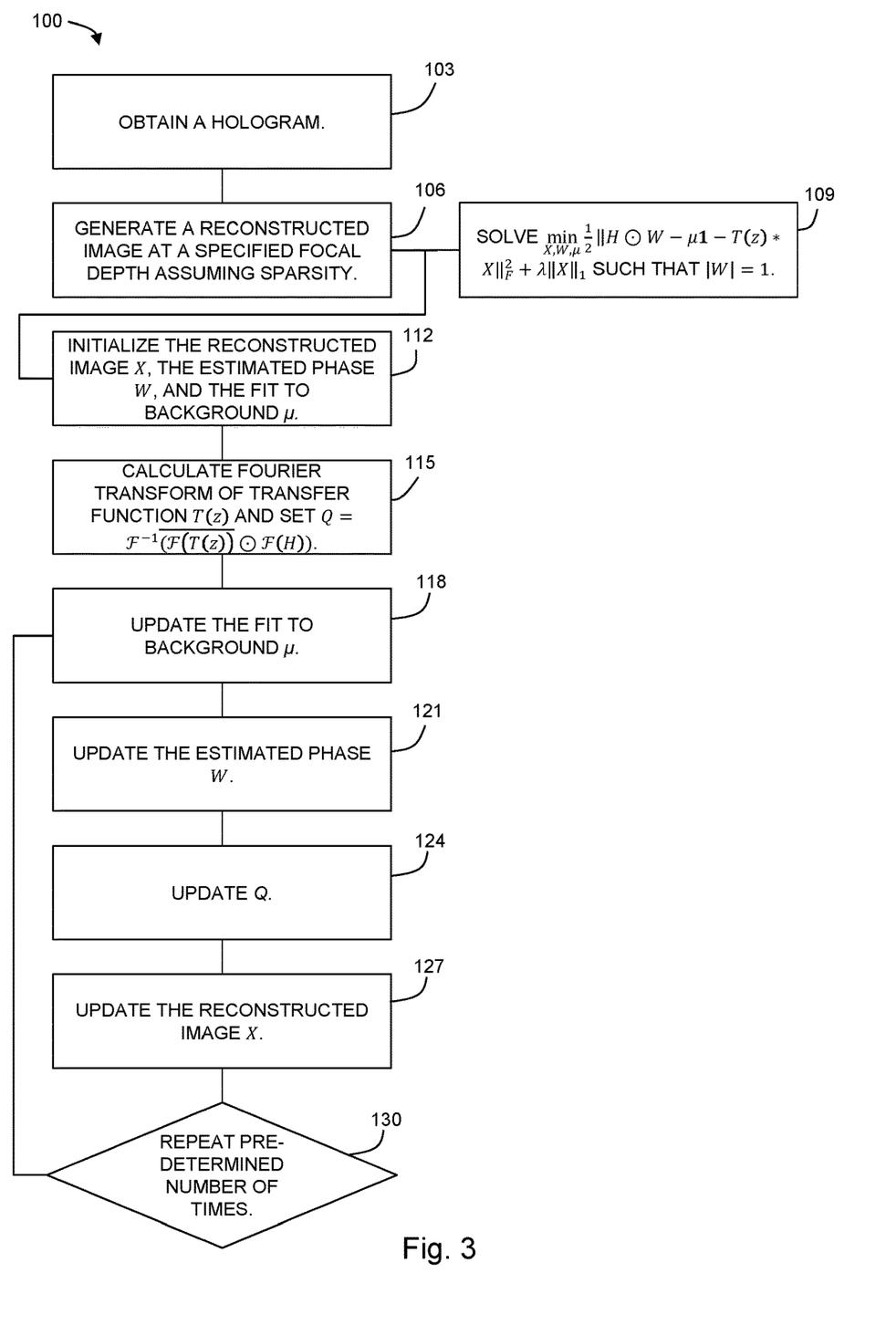
FIG. 3 is a chart showing a method according to an embodiment of the present disclosure.

With reference to FIG. 3, the present disclosure may be embodied as a method 100 for holographic reconstruction of an image. The method 100 includes obtaining 103 a hologram. A reconstructed image and phase are generated 106 at a specified focal depth using an assumption of sparsity. For example, the reconstructed image X and phase W can be generated 106 by solving 109

$$\min_{X,W,\mu} \frac{1}{2} \| H \odot W - \mu 1 - T(z)*X \|_F^2 + \lambda \| X \|_1$$

such that |W|=1. As described above, an approach to solving 109 eq. (7) is by using an alternating minimization to update the phase W, background level μ, and reconstructed image X.

In a particular embodiment, the reconstructed image X and phase W is generated 106 by setting 112 initial values for the reconstructed image X, the estimated phase W, and the fit to background μ. A Fourier transform of a transfer function T(z) is calculated 115, setting Q=$\mathcal{F}^{-1}(\overline{\mathcal{F}(T(z))}$ ⊙ $\mathcal{F}$(H)). The background level is updated by calculating 118 as $$\mu = \frac{\exp(izk)}{mn}\langle Q - X, 1\rangle.$$

The phase is updated by calculating 121 W=exp(i∡(μ1+ $\mathcal{F}^{-1}(\mathcal{F}(T(z))\odot\mathcal{F}(X))))$. An updated Q is calculated 124 by Q=$\mathcal{F}^{-1}(\mathcal{F}(T(z))\odot\mathcal{F}(H\odot W))$, and the reconstructed image is updated by calculating 127 X=SFT$_\lambda$(Q−μ exp(−izk)). The updating steps are repeated 130 for each of μ, W, Q, and X to determine the reconstructed image. The steps may be repeated 130 for a predetermined number of times. The number of times may be determined manually by performing the above method 100 until the reconstructed image is of a desirable quality. In another embodiment, the steps are repeated 130 until the change in the updated values of μ, W, and/or X is less than a threshold in an iteration. For example, the steps may be repeated 130 until the change in updated value of the reconstructed image is less than 10%, 5%, 3%, 2%, or 1%, or any other percentage value, in an iteration of the steps. The threshold value may be and percent change or an actual value. The threshold may be selected based on, for example, the quality of the reconstructed image balanced with the cost (e.g., computational time, etc.) of performing an additional iteration.

Figure 5:
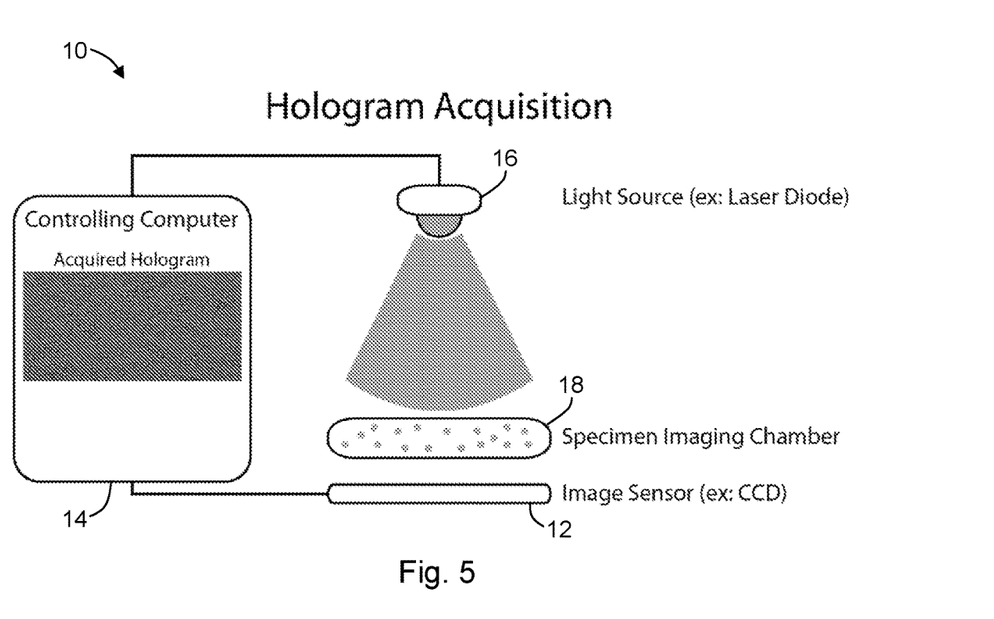
FIG. 5 is a diagram of a system according to another embodiment of the present disclosure.

In another aspect, the present disclosure may be embodied as a system 10 for lens-free imaging (see FIG. 5). The system 10 has a processor 14 in communication with a lens-free image sensor 12. In some embodiments, the system 10 may include a lens-free image sensor 12 for obtaining holographic images. The image sensor 12 may be, for example, an active pixel sensor, a charge-coupled device (CCD), a CMOS active pixel sensor, etc. The system 10 may further include a light source 16, such as a coherent light source. The image sensor 12 is configured to cooperate with the light source 16 to obtain a holographic image.

The processor 14 is programmed to perform any of the methods of the present disclosure. For example, the processor 14 may be programmed to operate the image sensor 12 to obtain a hologram and generate a reconstructed image and phase at a focal depth using an assumption of sparsity. The processor 14 may generate the reconstructed image by, for example, using an alternating minimization to update the phase, background level, and reconstructed image to solve eq. (7).

Figure 6:
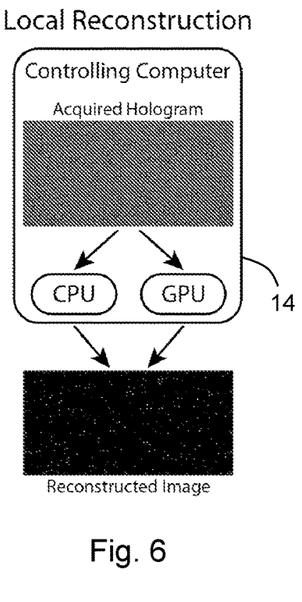
FIG. 6 depicts local reconstruction of a hologram acquired by a system according to another embodiment of the present disclosure.
Figure 7:
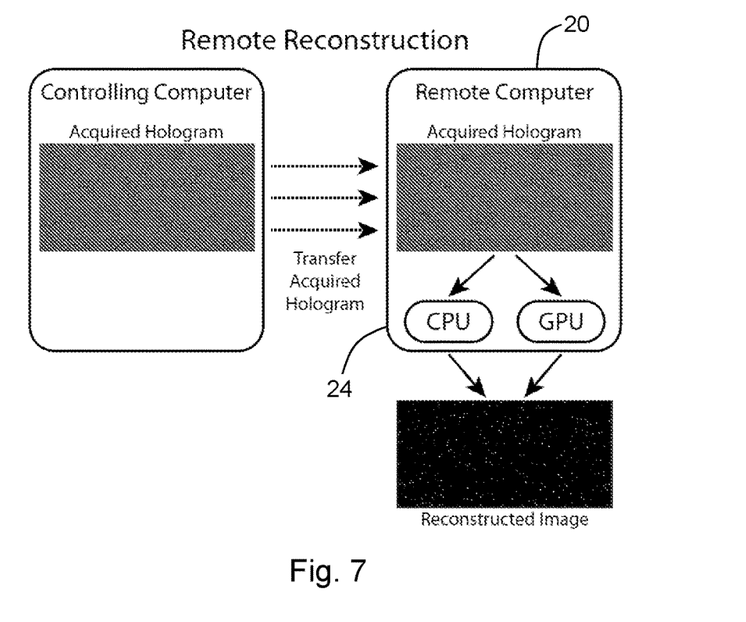
FIG. 7 depicts remote reconstruction of a hologram acquired by a system according to another embodiment of the present disclosure.

With reference to FIGS. 6-7, the system 10 may be configured for "local" reconstruction, for example, where image sensor 12 and the processor 14 make up the system 10. The system 10 may further include a light source 16 for illuminating a specimen. For example, the light source 16 may be a coherent light source, such as, for example, a laser diode providing coherent light. The system 10 may further include a specimen imaging chamber 18 configured to contain the specimen during acquisition of the hologram. In other embodiments (for example, as depicted in FIG. 7), the system 20 is configured for remote" reconstruction, where the processor 24 is separate from the image sensor and receives information from the image sensor through, for example, a wired or wireless network connection, a flash drive, etc.

The processor may be in communication with and/or include a memory. The memory can be, for example, a Random-Access Memory (RAM) (e.g., a dynamic RAM, a static RAM), a flash memory, a removable memory, and/or so forth. In some instances, instructions associated with performing the operations described herein (e.g., operate an image sensor, generate a reconstructed image) can be stored within the memory and/or a storage medium (which, in some embodiments, includes a database in which the instructions are stored) and the instructions are executed at the processor.

In some instances, the processor includes one or more modules and/or components. Each module/component executed by the processor can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general purpose processor, a central processing unit (CPU), an accelerated processing unit (APU), a field-programmable gate array (FPGA), an application specific integrated circuit (ASIC), a digital signal processor (DSP), and/or the like.

Some instances described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other instances described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, instances may be implemented using Java, C++, .NET, or other programming languages (e.g., object-oriented programming languages) and development tools. Additional examples of computer code include, but are not limited to, control signals, encrypted code, and compressed code.

Multi-Depth Reconstructions

To this point, the discussion has largely pertained to reconstructing an image at a single focal depth. However, one of the main advantages of holographic imaging over conventional microscopy is the potential to reconstruct an entire 3-dimensional volume of the specimen versus just a single image at one focal depth. One possibility is to the reconstruct multiple images independently using the algorithm described in the previous section while varying the focal depth, but unfortunately, if the specimen contains objects at multiple focal depths then the diffraction patterns from out-of-focus objects will corrupt the reconstruction at any given focal depth. Additionally, even in the case where only one image at a single focal depth is needed, it is still necessary to determine the correct depth of focus, which can be tedious to do manually. To address these issues, this section describes an extension to the model described in the prior section to reconstruct 3-dimensional volumes of a specimen.

Returning to the single focal depth model in (7), the only modification that is necessary is instead of reconstructing a single image, $X \in \mathbb{C}_{m \times n}$, a sequence of images, $X_i$, i=1, . . . , D is reconstructed, where each $X_i$ image corresponds to an image at a specified depth z[i]. More formally, given a vector of desired reconstruction depths $z \in \mathfrak{R}^D$, then images $\{X_i \in \mathbb{C}^{m \times n}\}_{i=1}^D$ may be found using the model, $$\min_{\{X_i\}_{i=2}^D, W, \mu} \frac{1}{2} \left\| H \odot W - \mu 1 - \sum_{i=1}^D T(z[i]) * X_i \right\|_F^2 + \lambda \sum_{i=1}^D \|X_i\|_1 \text{ such that} \quad (13)$$

$$|W| = 1.$$

Figure 4:
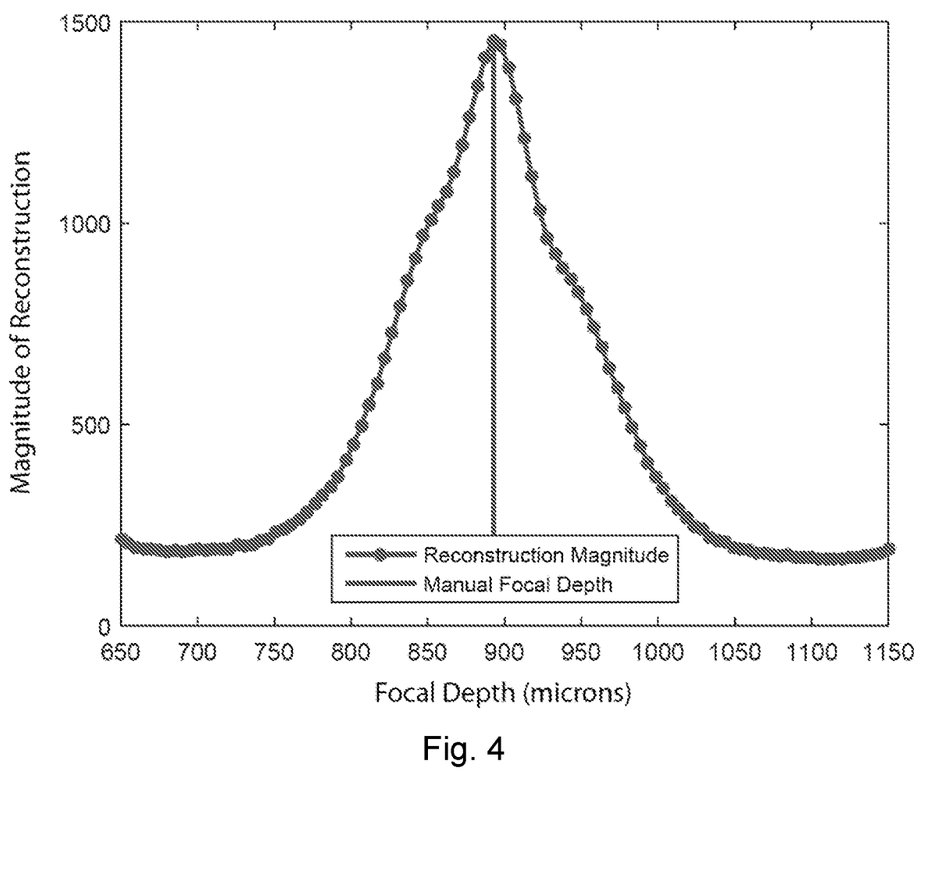
FIG. 4 is a chart showing the magnitude of the reconstructed 3-dimensional volume over focal depth, where the y-axis shows the $l_1$ norms of the reconstructed images, $\|X_i\|_1$, for 100 evenly spaced focal depths over the range [650, 1150] microns and the vertical line depicts the focal depth that was obtained by manually focusing the image.

This model is essentially the same as the model for reconstructing an image at a single focal depth as used in (7) but further extended to a full 3-dimensional volume. Unfortunately, by extending the model to a full 3-dimensional volume, it is no longer possible to reformulate the objective function as was done in (8) to derive a closed form update for X. Instead, a hybrid algorithm can be used, where the hybrid algorithm utilizes alternating minimization to update the W and μ variables and proximal gradient descent steps to update X. Additionally, most of the intermediate variables are left in the Fourier domain to facilitate the computation. The steps of the method are described in Method 2. FIG. 4 shows the magnitudes of the reconstructed $X_i$ images as a function of the specified focal depth for 100 uniformly spaced focal depths over the range [650, 1150] microns. Note that the image depth with the largest magnitude corresponds to the focal depth that was found by manually focusing the depth of reconstruction, demonstrating how reconstructing images over a 3-dimensional volume with the proposed method robustly and automatically recovers the focal depth of objects within the specimen.

---
METHOD 2 (Multiple Focal Depth Reconstruction)

INPUTS: H - Recorded hologram, z - Vector of focal depths, λ - Sparsity parameter.
OUTPUTS: $\{X_i\}_{i=1}^D$ - Reconstructed images, W - Estimated phase, μ - Fit to background.
Initialize: $X_i$ = 0, i = 1, . . . , D. W = 1. μ = 0.
Calculate the Fourier transforms of the transfer functions, $\mathcal{F}(T(z[i]))$, from (2).
Initialize: S = $\Sigma_{i=1}^D \mathcal{F}(T(z[i])) \odot \mathcal{F}(X_i)$ = 0. G = $\mathcal{F}(H \odot W)$. R = G − S.
Update the variables until the desired number of iterations.
for iter = 1 to number of iteration do
    μ = (G[1,1] − S[1,1])/(mn).
    W = exp(i∡(μ1 + $\mathcal{F}^{-1}$ (S))).
    G = $\mathcal{F}$(H ⊙ W).

---
METHOD 2 (Multiple Focal Depth Reconstruction)

R = G − S.
R[1,1] = R[1,1] − mnμ.
for i = 1 to D do $$Y_i = \mathcal{F}(X_i) + \frac{1}{D}\overline{\mathcal{F}(T(z[i]))} \odot R.$$

$$X_i = SFT_{\frac{\lambda}{D}}(\mathcal{F}^{-1}(Y_i)).$$

end for
S = $\Sigma_{i=1}^D \mathcal{F}(T(z[i])) \odot \mathcal{F}(X_i)$.
end for

---

Figure 8:
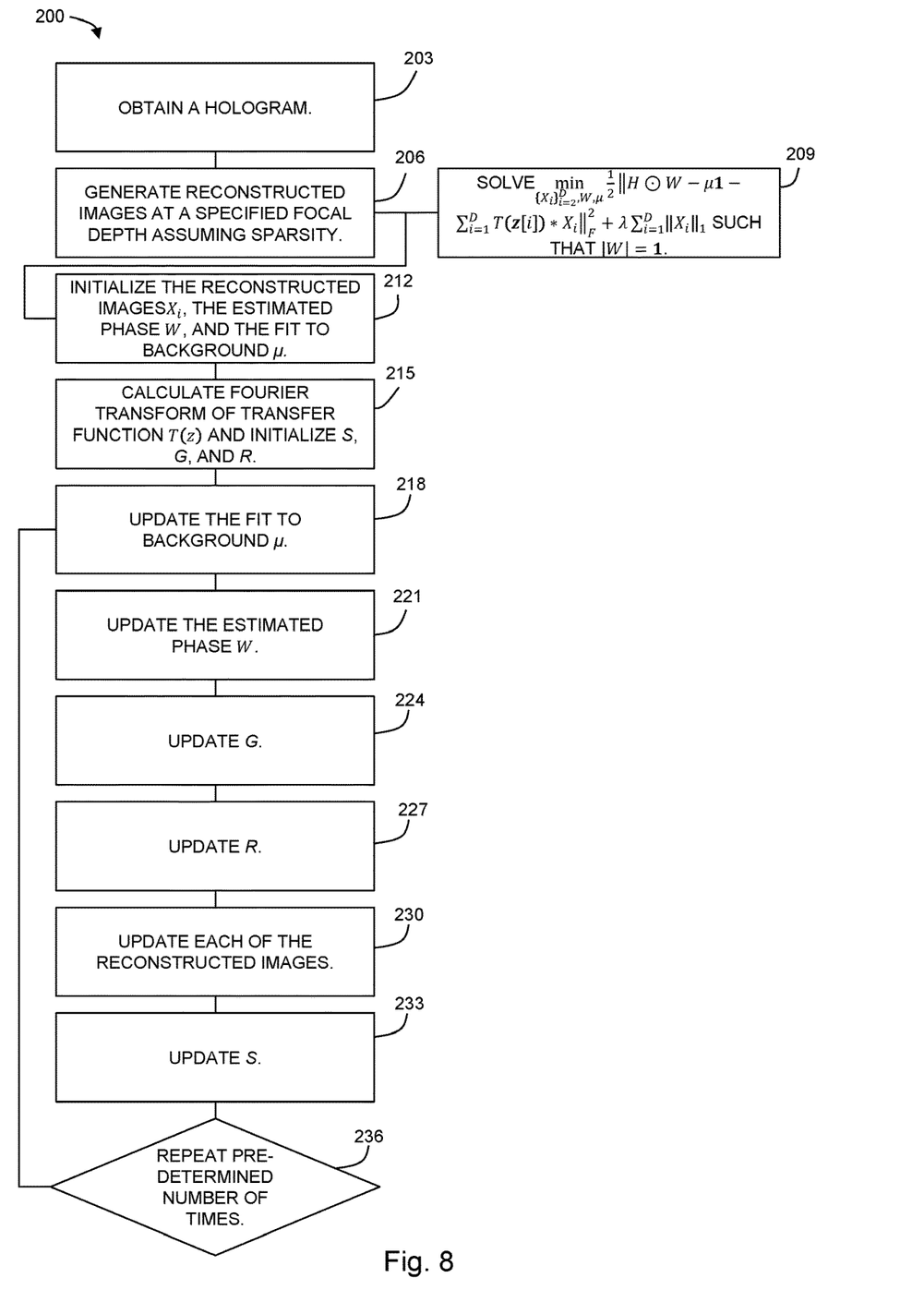
FIG. 8 is a chart showing a method according to another embodiment of the present disclosure.

With reference to FIG. 8, in another aspect, the present disclosure may be embodied as a method 200 for holographic reconstruction of images at a plurality of focal depths. The method 200 includes obtaining a hologram and generating 206 from the hologram a sequence of reconstructed images using an assumption of sparsity, wherein each image corresponds to a specified focal depth. For example, the reconstructed images $X_i$ and phase W can be generated 206 by solving 209

$$\min_{\{X_i\}_{i=2}^D, W, \mu} \frac{1}{2} \left\| H \odot W - \mu 1 - \sum_{i=1}^D T(z[i]) * X_i \right\|_F^2 + \lambda \sum_{i=1}^D \|X_i\|_1$$

such that |W|=1. As described above, an approach to solving 209 eq. (13) is by using an alternating minimization to update the phase W and background level μ and proximal gradient descent steps to update X.

In a particular embodiment, the reconstructed image X and phase W is generated 206 by setting 212 initial values for the a matrix of reconstructed images $X_i$ (where i=1, . . . , D), the estimated phase W, and the background level μ. A Fourier transform of a transfer function T (z[i]) is calculated 215 (where z[i] is a vector of focal depths), setting S=$\Sigma_{i=1}^D\mathcal{F}$ (T(z[i]))⊙$\mathcal{F}$ ($X_i$)=0, G=$\mathcal{F}$ (H⊙W), and R=G−S. The background level is updated by calculating 218 as μ=(G[1,1]−S[1,1])/(mn). The phase is updated by calculating 221 W=exp(i∡(μ1+$\mathcal{F}^{-1}$(S))). An updated G is calculated 224 by G=$\mathcal{F}$ (H⊙W) and an updated R is calculated 227 by R=G−S. An updated image is calculated 230 for each image in the matrix of images according to an $$Y_i = \mathcal{F}(X_i) + \frac{1}{D}\overline{\mathcal{F}(T(z[i]))} \odot R \text{ and } X_i = SFT_{\frac{\lambda}{D}}(\mathcal{F}^{-1}(Y_i)).$$

An update S is calculated 233 by solving S=$\Sigma_{i=1}^D\mathcal{F}$ (T(z [i]))⊙($X_i$). The updating steps are repeated 236 for each of W, G, R, $X_i$, and S to determine the reconstructed images. The steps may be repeated 236 for a predetermined number of times. The number of times may be determined manually by performing the above method 200 until the reconstructed images is of a desirable quality. In another embodiment, the steps are repeated 236 until the change in the updated values of μ, W, and/or $X_i$ is less than a threshold in an iteration. For example, the steps may be repeated 236 until the change in updated value of the reconstructed images is less than 10%, 5%, 3%, 2%, or 1%, or any other percentage value, in an iteration of the steps. The threshold value may be and percent change or an actual value. The threshold may be selected based on, for example, the quality of the reconstructed images balanced with the cost (e.g., computational time, etc.) of performing an additional iteration.

Although the present disclosure has been described with respect to one or more particular embodiments, it will be understood that other embodiments of the present disclosure may be made without departing from the spirit and scope of the present disclosure. The following are non-limiting sample claims intended to illustrate embodiments of the disclosure.

What is claimed is:

1. A system for lens-free imaging, comprising:
a processor in communication with a lens-free image sensor, the processor programmed to:
operate the image sensor to obtain a hologram H;
generate, from the hologram, a reconstructed image X and phase W at a focal depth z using an assumption of sparsity of objects in the reconstructed image X; and
wherein the reconstructed image X and phase W at focal depth z are generated by solving $$\min_{X,W,\mu} \frac{1}{2}\|H \odot W - \mu 1 - T(z)*X\|_F^2 + \lambda\|X\|_1 \text{ such that } |W|=1,$$

where T(z) is a transfer function which models light diffraction through the sample at z, $\mu$ is a scalar accounting for a non-zero background, 1 is a matrix of ones, $\lambda$ is a sparsity parameter.

2. The system of claim 1, further comprising an image sensor.

3. The system of claim 2, wherein the image sensor is an active pixel sensor, a CCD, or a CMOS active pixel sensor.

4. The system of claim 1, further comprising a coherent light source.

5. A method of holographic reconstruction of an image, comprising:
obtaining a hologram H;
generating, from the hologram, a reconstructed image $X \in \mathbb{C}^{m \times n}$ and phase W at a focal depth z using an assumption of sparsity of objects in the reconstructed image X; and
wherein the reconstructed image X and phase W at focal depth z are generated by solving $$\min_{X,W,\mu} \frac{1}{2}\|H \odot W - \mu 1 - T(z)*X\|_F^2 + \lambda\|X\|_1 \text{ such that } |W|=1,$$

where T(z) is a transfer function which models light diffraction through the sample at z, $\mu$ is a scalar accounting for a non-zero background, 1 is a matrix of ones, $\lambda$ is a sparsity parameter.

6. The method of claim 5, wherein $$\min_{X,W,\mu} \frac{1}{2}\|H \odot W - \mu 1 - T(z)*X\|_F^2 + \lambda\|X\|_1$$

is solved by using an alternating minimization to update W, $\mu$, and X.

7. The method of claim 5, wherein $$\min_{X,W,\mu} \frac{1}{2}\|H \odot W - \mu 1 - T(z)*X\|_F^2 + \lambda\|X\|_1$$

is solved by:
(a) setting initial values for the reconstructed image X, the estimated phase W, and the scalar accounting for a non-zero background $\mu$;
(b) calculating a Fourier transform of a transfer function T(z), and setting $Q=\mathcal{F}^{-1}(\mathcal{F}(\overline{T(z)}) \odot \mathcal{F}(H))$;
(c) calculating $$\mu = \frac{\exp(izk)}{mn}\langle Q-X, 1\rangle;$$

(d) calculating $W=\exp(i\measuredangle(\mu 1 + \mathcal{F}^{-1}(\mathcal{F}(T(z)) \odot (X))))$;
(e) calculating $Q=\mathcal{F}^{-1}(\mathcal{F}(\overline{T(z)}) \odot \mathcal{F}(H \odot W))$
(f) calculating $X=SFT_\lambda(Q-\mu \exp(-izk))$, wherein $SFT_\lambda$ is a complex soft-thresholding operator given by $$SFT_\lambda\{Z\}[i,j] = \begin{cases} Z[i,j]\frac{|Z[i,j]|-\lambda}{|Z[i,j]|} & |Z[i,j]| > \lambda \\ 0 & |Z[i,j]| \leq \lambda \end{cases},$$

wherein Z[i,j] is the entry of Z in the $i^{th}$ row and $j^{th}$ column; and
(g) repeating steps (c)-(f) to determine reconstructed image X.

8. The method of claim 7, wherein steps (c)-(f) are repeated a predetermined number of times.

9. The method of claim 7, wherein the initial values are X=0, W=1, and $\mu$=0.

10. The method of claim 5, wherein T(z) is defined such that $$\mathcal{F}(T(z))[k_x, k_y] = \begin{cases} \exp(iz\sqrt{k^2 - k_x^2 - k_y^2}) & k_x^2 + k_y^2 + k^2 \\ 0 & \text{otherwise} \end{cases}$$

where $k=2\pi/\gamma$ is a wavenumber for the light with wavelength $\gamma$ used to acquire the hologram and $(k_x, k_y)$ denote spatial frequencies in horizontal and vertical directions, respectively.

11. A method of holographic reconstruction of images at a plurality of focal depths, comprising:
obtaining a hologram H;
generating, from the hologram, a sequence of reconstructed images $X_i \in \mathbb{C}^{m \times n}$ and phase W, wherein each image corresponds to an image at a specified focal depth z[i], using an assumption of sparsity of objects in the reconstructed images $X_i$; and
wherein the reconstructed images $X_i$ and phase W are generated by solving $$\min_{\{X_i\}_{i=2}^D, W, \mu} \frac{1}{2}\left\|H \odot W - \mu 1 - \sum_{i=1}^D T(z[i])*X_i\right\|_F^2 +$$

$$\lambda\sum_{i=1}^D \|X_i\|_1 \text{ such that } |W|=1,$$

where T(z[i]) is a transfer function which models light diffraction through the sample at z[i], µ is a scalar accounting for a non-zero background, 1 is a matrix of ones, D is a number of reconstructed images in the sequence of reconstructed images $X_i$, λ is a sparsity parameter.

12. The method of claim 11, wherein $$\min_{\{X_i\}_{i=2}^D, W, \mu} \frac{1}{2} \left\| H \odot W - \mu 1 - \sum_{i=1}^D T(z[i]) * X_i \right\|_F^2 + \lambda \sum_{i=1}^D \|X_i\|_1$$

such that |W|=1 is solved by using an alternating minimization to update W and µ and proximal gradient descent steps to update X.

13. The method of claim 12, wherein $$\min_{\{X_i\}_{i=2}^D, W, \mu} \frac{1}{2} \left\| H \odot W - \mu 1 - \sum_{i=1}^D T(z[i]) * X_i \right\|_F^2 + \lambda \sum_{i=1}^D \|X_i\|_1$$

such that |W|=1 is solved by:
  (a) setting a matrix of reconstructed images $X_i$, an estimated phase W, and a fit to background parameter µ to respective initial values, where i=1, . . . , D;
  (b) calculating a Fourier transform of transfer functions T(z[i]), and setting $S = \sum_{i=1}^D \mathcal{F}(T(z[i])) \odot (X_i) = 0$, G=(H⊙W), and R=G−S;
  (c) calculating µ=(G[1,1]−S[1,1])/(mn);
  (d) calculating W=exp (i∡(µ1+$\mathcal{F}^{-1}$(S)));
  (e) calculating G=$\mathcal{F}$ (H⊙W);
  (f) calculating R=G−S;
  (g) calculating R[1,1]=R[1,1]−mnµ;
  (h) for each image, calculate $$Y_i = \mathcal{F}(X_i) + \frac{1}{D} \overline{\mathcal{F}(T(z[i]))} \odot R \text{ and } X_i = SFT_{\frac{\lambda}{D}}(\mathcal{F}^{-1}(Y_i)),$$

wherein $SFT_\lambda$ is a complex soft-thresholding operator given by $$SFT_\lambda\{Z\}[i,j] = \begin{cases} Z[i,j] \frac{|Z[i,j]| - \lambda}{|Z[i,j]|} & |Z[i,j]| > \lambda \\ 0 & |Z[i,j]| \leq \lambda \end{cases},$$

wherein Z[i,j] is the entry of Z in the $i^{th}$ row and $j^{th}$ column;
  (i) calculating $S = \sum_{i=1}^D \mathcal{F}(T(z[i])) \odot \mathcal{F}(X_i)$; and
  (j) repeating steps (b)-(i) to obtain reconstructed images $X_i$.

* * * * *